April 26, 1966    S. D. SMITH ETAL    3,248,119
HIGH VACUUM SEAL
Filed Sept. 19, 1963
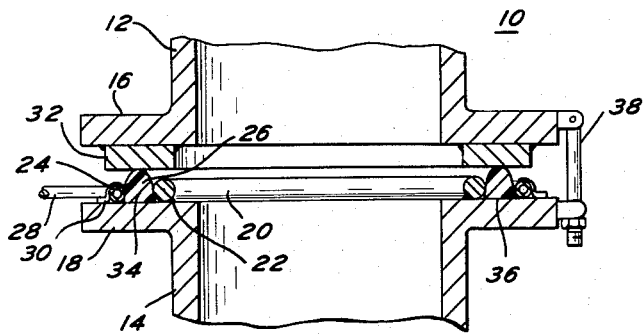
FIG.1
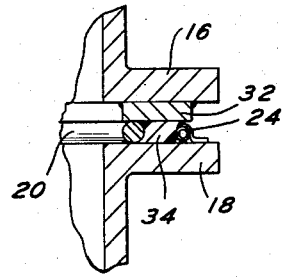
FIG.2
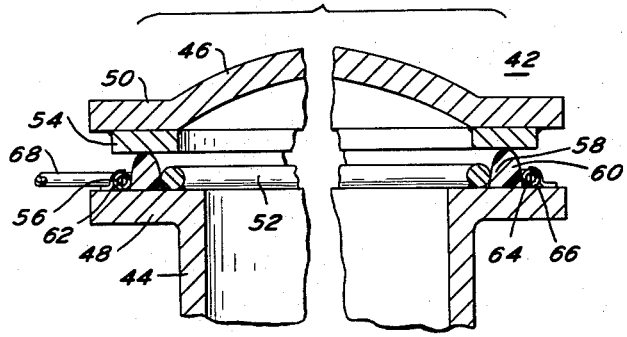
FIG.5
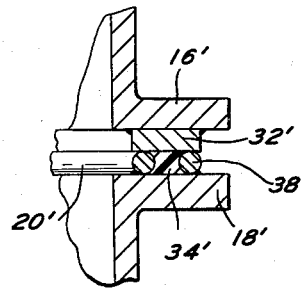
FIG.3
FIG.4
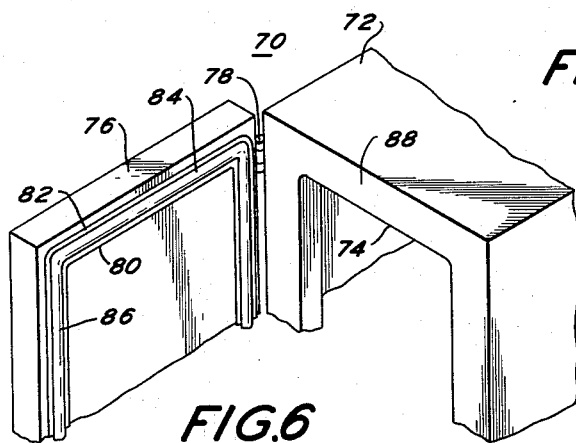
FIG.6
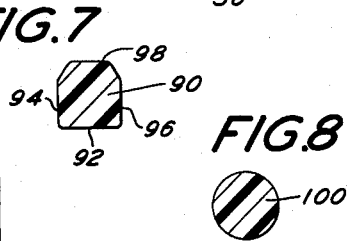
FIG.7
FIG.8
INVENTORS
SIDNEY SMITH
HENRY O. HERRMANN
BY Arthur H. Seidel
ATTORNEY

United States Patent Office 3,248,119
Patented Apr. 26, 1966

3,248,119
HIGH VACUUM SEAL
Sidney D. Smith and Henry O. Herrmann, Philadelphia, Pa., assignors, by mesne assignments, to Pennsalt Chemicals Corporation, Philadelphia, Pa., a corporation of Pennsylvania
Filed Sept. 19, 1963, Ser. No. 310,058
2 Claims. (Cl. 277—22)

In general, this invention relates to a new and improved high vacuum seal and more particularly to a high vacuum sealing arrangement for large pressure vessels wherein the formation of O-ring grooves is impractical.

It has long been recognized in the high vacuum field than an O-ring seal is the best type for the conditions of high vacuum operation because there is no "bottoming" of the seal and good area contact is always provided by the O-ring gasket. However, an O-ring seal has required in the past an O-ring groove within which the gasket was placed. For extremely large vacuum enclosures such as high vacuum furnaces and the like whose diameter might be twenty feet or more, the machining of an O-ring groove was extremely costly and inefficient. Further, where the vacuum enclosure was manufactured of stainless steel or the like, this machining was virtually impossible. If the enclosure to be sealed underwent high temperature changes, there was no way of cooling the O-ring seal when a groove was made in the mating surfaces of the high vacuum apparatus.

Therefore, it is the general object of this invention, to provide a new and improved high vacuum seal.

Another object of this invention is the provision of a new and better high vacuum seal which eliminates the need for providing O-ring grooves.

A further object of this invention is the provision of a new and better high vacuum seal of the O-ring type wherein the O-ring gasket can be cooled.

Still another object of this invention is the provision of a new and better O-ring seal for a high vacuum operation which is simple and inexpensive to manufacture.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a cross sectional view of the high vacuum seal incorporating one embodiment of the present invention.

FIGURE 2 is a partial cross sectional view of the seal of FIGURE 1 in the clamped position.

FIGURE 3 is a partial cross sectional view similar to FIGURE 2 of a second embodiment of the present invention.

FIGURE 4 is a cross sectional view of the O-ring utilized in the high vacuum seal of FIGURES 1–3.

FIGURE 5 is a cross sectional view of a vacuum chamber incorporating a third embodiment of the present invention.

FIGURE 6 is a partial perspective view of a fourth embodiment of the present invention.

FIGURE 7 is a cross sectional view of another type of gasket which can be utilized in the present invention.

FIGURE 8 is a cross sectional view of still another type of gasket which can be utilized with the high vacuum seal of the present invention.

In FIGURE 1, there is shown a vacuum chamber 10 incorporating the high vacuum seal of the present invention. The vacuum chamber 10 includes an upper half 12 and a lower half 14 which are to mate and seal to form the vacuum chamber 10.

The upper chamber 12 has an outwardly extending annular flange 16 along the bottom edge thereof.

The lower half 14 of the vacuum chamber 10 also has an outwardly extending flange 18 along the upper edge thereof.

In the prior art practices, the upper flange 16 and lower flange 18 would normally be sealed by providing an O-ring groove in one of the flanges and placing an O-ring gasket in the groove while clamping the flanges 16 and 18 together. However, the vacuum chamber 10 may be more than fifteen feet in diameter and manufactured of a hard to mill material such as stainless steel. Thus, it would be difficult if not impossible to mill such a groove on the site of the equipment. Thus, the chamber could not be sealed for high vacuum purposes. Further, if the chamber were to be heated, there would be no way of cooling an O-ring gasket in a groove formed in one of the flanges 16 and 18.

Therefore, as shown in FIGURE 1, there is provided an annular inner ring 20 which is seal welded along the bottom edge thereof with a seal weld 22 to the lower outwardly extending flange 18. The annular inner ring 20 in one preferred embodiment of the present invention was ⅞ inch in diameter.

A second tubular outer ring 24 is also provided on the flange 18 concentric with the inner ring 20 and spaced therefrom to define a gasket receiving channel 26. The tubular outer ring 24 is connected to a suitable source of coolant, such as water, through a conduit 28 and is secured to the flange 18 by a suitable bracket 30.

An upper flat metal gasket 32 is seal welded to the upper outwardly extending flange 16. The gasket 32 is annular in shape and rectangular in cross section having an inner diameter equal to the inner diameter of annular inner ring 20 and outer diameter equal to the outer diameter of outer ring 24.

An O-ring gasket 34 is placed within the channel 26. The gasket 34 has a flat bottom edge portion 36 for engaging the outwardly extending flange 18. The gasket 34 has an inverted parabolic cross section in the unstressed condition shown in FIGURE 1. The gasket 36 can be manufactured of neoprene, rubber, or other elastomeric material. Preferably, it should be resilient and have a high durometer hardness rating. In one preferred embodiment of the present invention, the O-ring gasket 34 was manufactured of hard resilient rubber having a durometer rating of 70.

When the upper half 12 of the vacuum chamber 10 is to be sealed to the lower half 14 thereof, clamps 38 are applied to the uppermost and lowermost surfaces of outwardly extending flanges 16 and 18 respectively. When this occurs, the gasket 32 compresses O-ring gasket 34 until there is metal to metal contact between gasket 32 and rings 20 and 24.

As shown in FIGURE 2, the O-ring gasket having an inverted parabolic cross section with a flat bottom edge will conform to the space between the inner ring 20 and the outer ring 24 forming a perfect high vacuum seal for the chamber 10. Coolant fluid will flow through conduit 28 to maintain the now compressed O-ring gasket 34 cooled during the heating of the vacuum chamber.

Thus, a perfect seal has been achieved on a vacuum chamber without the necessity for milling an O-ring groove. This can be achieved where large milling machines are not available, and further can be simply and easily manufactured. That is, the gasket 32 can be seal welded to the flanges 16 and the rings 20 and 24 can be attached to flange 18 without the need for costly milling apparatus. The seal weld of the ring 20 and gasket 32 prevents the loss of vacuum through the metal rings.

The gasket 34 in combination with the metal to metal contact of the gasket 32 and rings 24 and 20 prevents the loss of vacuum through these surfaces. It should be noted that the flanges may be leveled by machining if desired within the teachings of the present invention.

In FIGURE 3, there has been shown a second embodiment of the present invention in which all elements similar to that shown in FIGURE 2 have been indicated by prime numerals. The only change between the apparatus of FIGURE 2 and the apparatus of FIGURE 3 is the substitution of a solid outer ring 38 for the tubular outer ring 24 shown in FIGURE 2. The solid outer ring 38 provides more strength to the high vacuum seal in the vertical direction and can be utilized where the vacuum chamber is not heated so that there is no problem of cooling the gasket 34'.

In FIGURE 4, the gasket 34 has been shown with its flat bottom edge 36 and its inverted parabolic upper surface 40.

In FIGURE 5, there is shown a vacuum vessel 42 consisting of a crucible 44 and a lid or cover 46. The crucible 44 has an outwardly extending flange 48 around the upper open end thereof, and the cover 46 has an outwardly extending flange 50 about the lower open end thereof. Flanges 48 and 50 are intended to matingly seal the vacuum vessel 42.

Here again, an O-ring groove is not formed in one of the upper or lower flanges 48 and 50, but rather first an inner ring member 52 is seal welded to the lower flange 48. An upper gasket 54 is provided which is seal welded to the lowermost surface of flange 50. Gasket 54 is annular in shape and rectangular in cross section having an inner diameter equal to the inner diameter of ring 52 and an outer diameter equal to the outer diameter of a second annular member 56 concentric with ring 52 and clamped to the upper surface of flange 48. The space between annular member 56 and ring 52 defines a channel 58 for receiving an O-ring gasket 60 for the purposes discussed above.

The seal achieved in the FIGURE 5 embodiment is exactly similar to the seal achieved in the FIGURE 1 embodiment with the exception that the second annular member 56 is not the tubular outer ring 30 of FIGURE 1. Rather, the member 56 has a vertical annular support 62 through the center thereof forming two annular chambers 64 and 66. Conduit 68 is utilized to feed coolant fluid such as water to the two annular chambers 64 and 66. Vertical annular support 62 gives vertical support to the member 56. Since the force on the seal in many cases reaches one ton per square foot, the strength of the annular member 56 must be reinforced. This vertical annular support gives such reinforcement to the seal.

In FIGURE 6, there is shown a high vacuum seal for a hinged door enclosure 70. The enclosure 70 includes a chamber 72 having an open end 74 which is to be closed by a hinged door 76. The door 76 is mounted on suitable hinges 78 along one side edge of the chamber 72. The door 76 has seal welded thereto a suitable inner annular ring 80 and an outer annular ring 82 concentric therewith so as to define an annular channel 84 within which is placed a suitable O-ring gasket 86. The face 88 of the enclosure 72 defining the opening 74 acts as a gasket to achieve metal to metal contact between the face 88 and the inner and outer rings 80 and 82 respectively. The gasket 86 is exactly similar to the gasket 60 and gasket 36 discussed previously. Thus, upon compression of the gasket 86, the compressed material will conform to the shape of the inner and outer rings 80 and 82 defining the channel 84.

If desired, the O-ring gasket can be manufactured with a cross section as shown in FIGURE 7. That is, in FIGURE 7 a gasket 90 has been shown having a flat bottom edge 92 and upstanding vertical inner and outer side walls 94 and 96. The upper corners of the gasket 90 have been cut off so as to form a rounded off top portion 98. That is, the top half of the gasket 90 has less volume than the lower half of the gasket 90. Under compression, there will be no tendency of the gasket 90 to achieve edge contact with the metal gasket but rather will achieve area contact as the side edges of the gasket 90 will not be under more compression than the center thereof.

As can be seen, the preferred embodiment of the present invention includes an O-ring gasket with a flat bottom wall and a bottom half which has more volume than the upper half thereof.

However, as shown in FIGURE 8, it is still possible utilizing the principles of the present invention to use a standard circular cross section O-ring gasket 100 as shown in FIGURE 8 to achieve a high vacuum seal. However, the O-ring gaskets of FIGURES 1–7 are preferred.

The present invention may be embodied in other specific forms without departing from the spirit or essential attributes thereof and, accordingly, reference should be made to the appended claims, rather than to the foregoing specification as indicating the scope of the invention.

We claim:

1. A vacuum seal comprising first and second rigid surfaces, an inner rigid annular member secured to said first surface, an outer rigid annular member secured to said first surface, said inner and outer members defining a gasket receiving channel therebetween, a resilient annular gasket mounted within said channel when said gasket is in an unstressed condition, said inner rigid annular member being welded to said first surface along the periphery thereof, said outer rigid annular member being tubular in cross section, means for supplying coolant fluid to said tubular outer rigid annular member, and means for forcing said second surface against said gasket and said inner and outer members to form a vacuum seal between said first and second surfaces.

2. The vacuum seal of claim 1 wherein said tubular annular rigid member has a vertical annular support extending between the portion of said outer member closest to said first surface and the portion furthest from said first surface, said vertical annular support dividing said tubular annular member so as to form two chambers within said outer member.

References Cited by the Examiner

UNITED STATES PATENTS

| 2,157,357 | 5/1939 | Straty | 277—22 X |
| 2,263,815 | 11/1941 | Witte | 29—451 |
| 2,665,461 | 1/1954 | Rodgers | 277—207 X |
| 2,691,460 | 10/1954 | Barnaby | 277—22 X |
| 2,793,428 | 5/1957 | Northrop | 29—451 |
| 2,914,350 | 11/1959 | Smith | 277—180 X |

FOREIGN PATENTS

| 1,079,221 | 11/1954 | France. |
| 701,614 | 12/1953 | Great Britain. |
| 937,707 | 9/1963 | Great Britain. |

LAVERNE D. GEIGER, *Primary Examiner.*

EDWARD V. BENHAM, *Examiner.*

S. ROTHBERG, *Assistant Examiner.*